US005765346A

United States Patent [19]
Benter et al.

[11] Patent Number: 5,765,346
[45] Date of Patent: Jun. 16, 1998

[54] MOWER DECK

[75] Inventors: Dean William Benter, Horicon; Gary David Hohnl, Slinger, both of Wis.

[73] Assignee: Deere & Company, Moline, Ill.

[21] Appl. No.: 823,768

[22] Filed: Mar. 24, 1997

[51] Int. Cl.$^6$ .................................................. A01D 67/00
[52] U.S. Cl. ........................... 56/2; 56/320.1; 56/17.4; 56/DIG. 9; 56/DIG. 20
[58] Field of Search ........................... 56/320.1, 320.2, 56/16.7, 2, 17.5, 255, 295, DIG. 17, DIG. 22, DIG. 24, 17.4, DIG. 20, DIG. 9

[56] References Cited

U.S. PATENT DOCUMENTS

| | | | |
|---|---|---|---|
| 3,797,212 | 3/1974 | Pursel | 56/255 |
| 4,189,903 | 2/1980 | Jackson et al. | 56/255 |
| 4,951,449 | 8/1990 | Thorud | 56/320.1 X |
| 5,191,756 | 3/1993 | Kuhn | 56/17.5 |
| 5,267,429 | 12/1993 | Kettler et al. | 56/295 |
| 5,488,821 | 2/1996 | McCunn et al. | 56/320.2 |
| 5,628,171 | 5/1997 | Stewart et al. | 56/320.2 |

OTHER PUBLICATIONS

Deere & Co., Meeting Customer Needs Product Services Information Bulletin M112986, 8 pages, dated May 1995, published in the U.S.A.

*Primary Examiner*—Heather Shackelford

[57] ABSTRACT

A composite insert is provided for converting a rotary mower deck from side discharge to mulching usage. The insert can be detatchably mounted in the mower deck and provides a cutting chamber wherein grass can be cut, mulched and redistributed onto the ground beneath the mower deck. The insert forms with the mower housing a cutting chamber which includes a reduced cross-sectional area at the front portion that provides for confining and accelerating the movement of air and clippings there through to minimize build-up of clippings adjacent the chamber surfaces. At the rear portions of the chamber, a larger cross-sectional area is provided to permit the clippings to slow down and disperse, allowing the clippings to be distributed and/or redirected into the blade for mulching. It is preferred that the insert is adapted for use with a two-bladed mower deck.

14 Claims, 5 Drawing Sheets

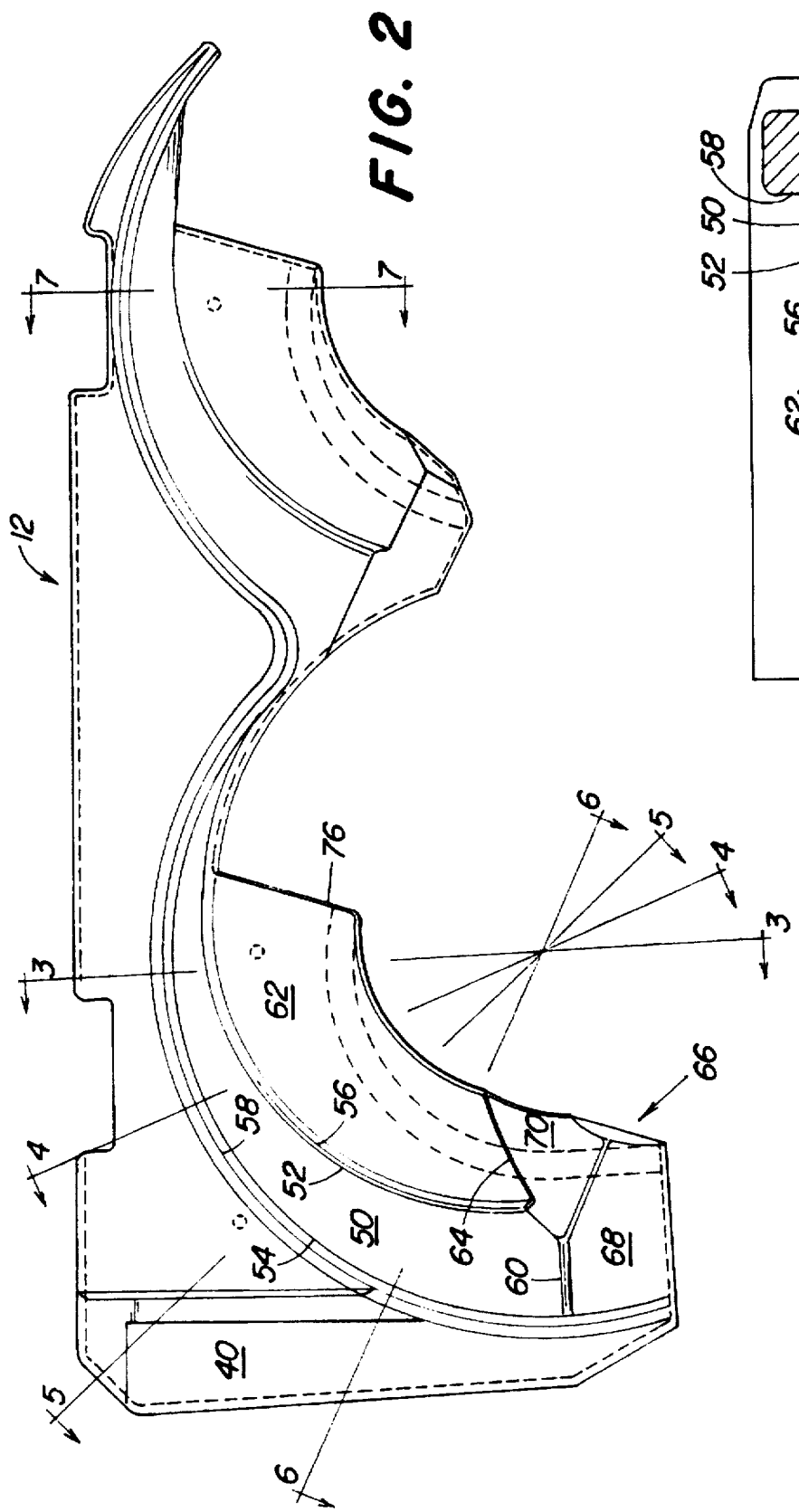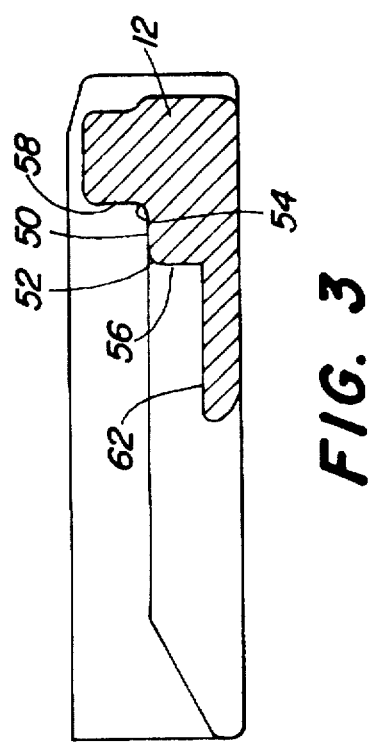

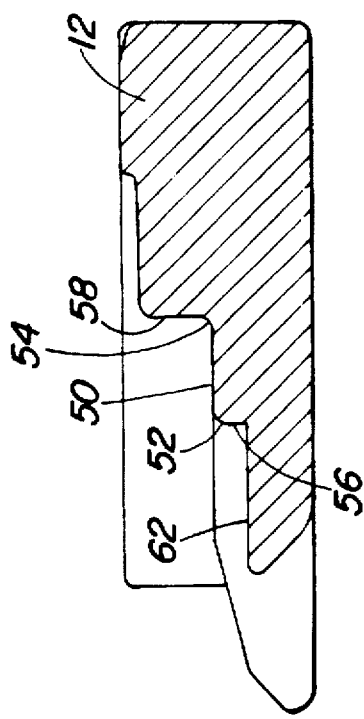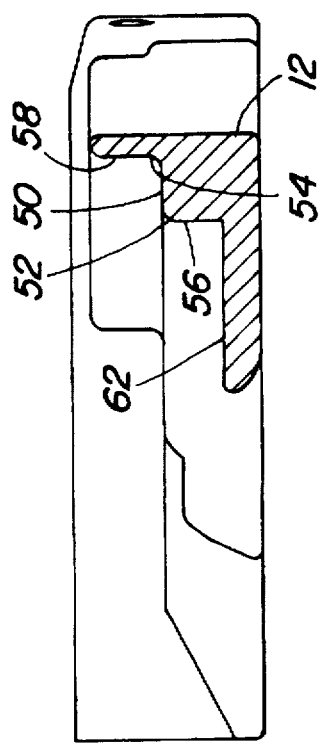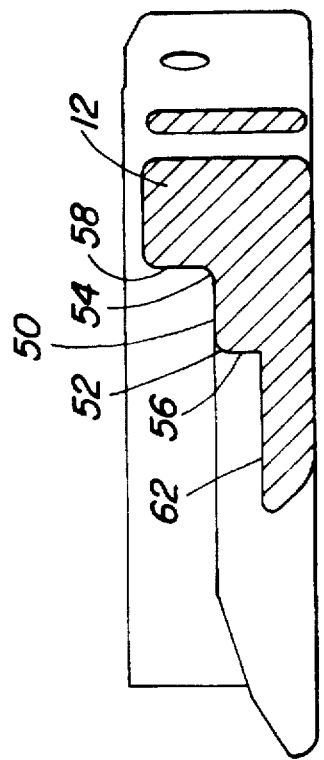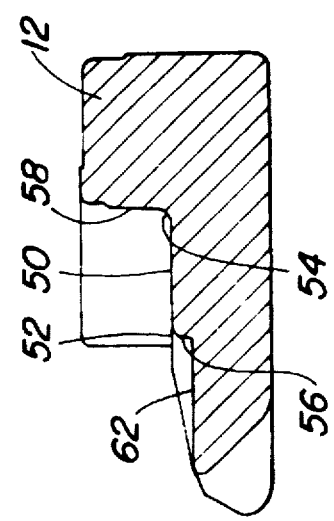

MOWER DECK

RELATED APPLICATIONS

Applications having related subject matter and being commonly owned and subject to an obligation of assignment to assignee of this application at the time this invention was made include patent application for MULCHING MOWER DECK, Ser. No. 08/789,226, filed 24 Jan. 1997 and patent application for MOUNTING PLATE FOR MOWER DECK, Ser. No. 08/788,972, filed 24 Jan. 1997.

FIELD OF THE INVENTION

The present invention relates to material cutting implements for vehicles such as lawn and garden tractors, and more specifically to rotary mower decks and a mulching insert usable with those decks.

BACKGROUND OF THE INVENTION

It is often desirable when using material cutting implements such as rotary mowers, to avoid the time and trouble required to collect cut material such as grass. Further, due to restrictions governing disposal of grass and similar cut materials, it is often desirable to mulch the material being cut and distribute it back over and down into the uncut material. Mulching of cut material also serves to provide nutrients for the uncut material. Accordingly, mulching mowers and mulching kits for converting rotary mowers to a mulching usage have been provided to meet these needs.

Frequently however, commercial mulching devices include obstructions within the mower deck cutting chamber that result in the accumulation of cut material at gap or pocket areas between the mulching device and the mower housing. These accumulations, if not routinely removed from the mower deck, impair the flow of air and cut material within the chamber as well as the efficiency of the mowing and mulching process, and occasionally fall out of the deck, leaving an undesirable appearance to the mowed area.

SUMMARY OF THE INVENTION

It would therefore be desirable to provide a mulching insert that could be used with a conventional rotary mower deck, permitting it to be converted from side or rear discharge to mulching. Further, it would be desirable to provide a mulching insert having a smooth surface and fit within the deck, to minimize gaps, pockets and similar obstructions therein. It would further be desirable to improve material and air flow within the chamber so that the accumulations of material within the chamber are minimized, cutting and mulching efficiency is improved, clean out time is reduced and the finished appearance of the surface cut is improved.

Towards these ends, there is provided a mulching insert that can be quickly attached or removed from conventional mower decks. The insert is also provided with a plug structure to block the opening in the mower deck where cut material is normally discharged.

The insert is composed of a composite material with smooth surfaces that nests in the front and the one side portion of the cutting chamber. Its shape includes a stepped deck at the front portion of the chamber and above the path traversed by the cutting tip portion of the blade. This lowered deck surface provides a cross-sectional area at the front of the chamber where grass is cut which is smaller than the cross-sectional area in the more open rear and one side of the cutting chamber where the clippings are distributed. As the clippings are cut and moved through the smaller cross-sectional area, they are more closely confined and directed and are less likely to stick to the chamber surfaces. At the rear and one side of the chamber where the cross-sectional area is larger, the flow rate of the clippings and air is reduced to facilitate redistribution of the material back onto the ground.

The insert further includes a mulching ramp which is spaced radially inwardly from the stepped or lower deck surface and which extends from the front portion of the chamber to one side portion for directing clippings back down and in toward the mulching portion of the cutting blade for recutting.

In its preferred form, the insert is further provided with dual sections, which are usable with a two bladed rotary mower.

BRIEF DESCRIPTION OF THE DRAWINGS

FIG. 2 is a bottom view of the composite insert.

FIG. 3 is a sectional view of the insert taken along lines 3—3 of FIG. 2

FIG. 4 is a sectional view of the insert taken along lines 4—4 of FIG. 2.

FIG. 5 is a sectional view of the insert taken along lines 5—5 of FIG. 2.

FIG. 6 is a sectional view of the insert taken along lines 6—6 of FIG. 2.

FIG. 7 is a sectional view of the insert taken along lines 7—7 of FIG. 2.

DESCRIPTION OF THE PREFERRED EMBODIMENT

Figure 1:
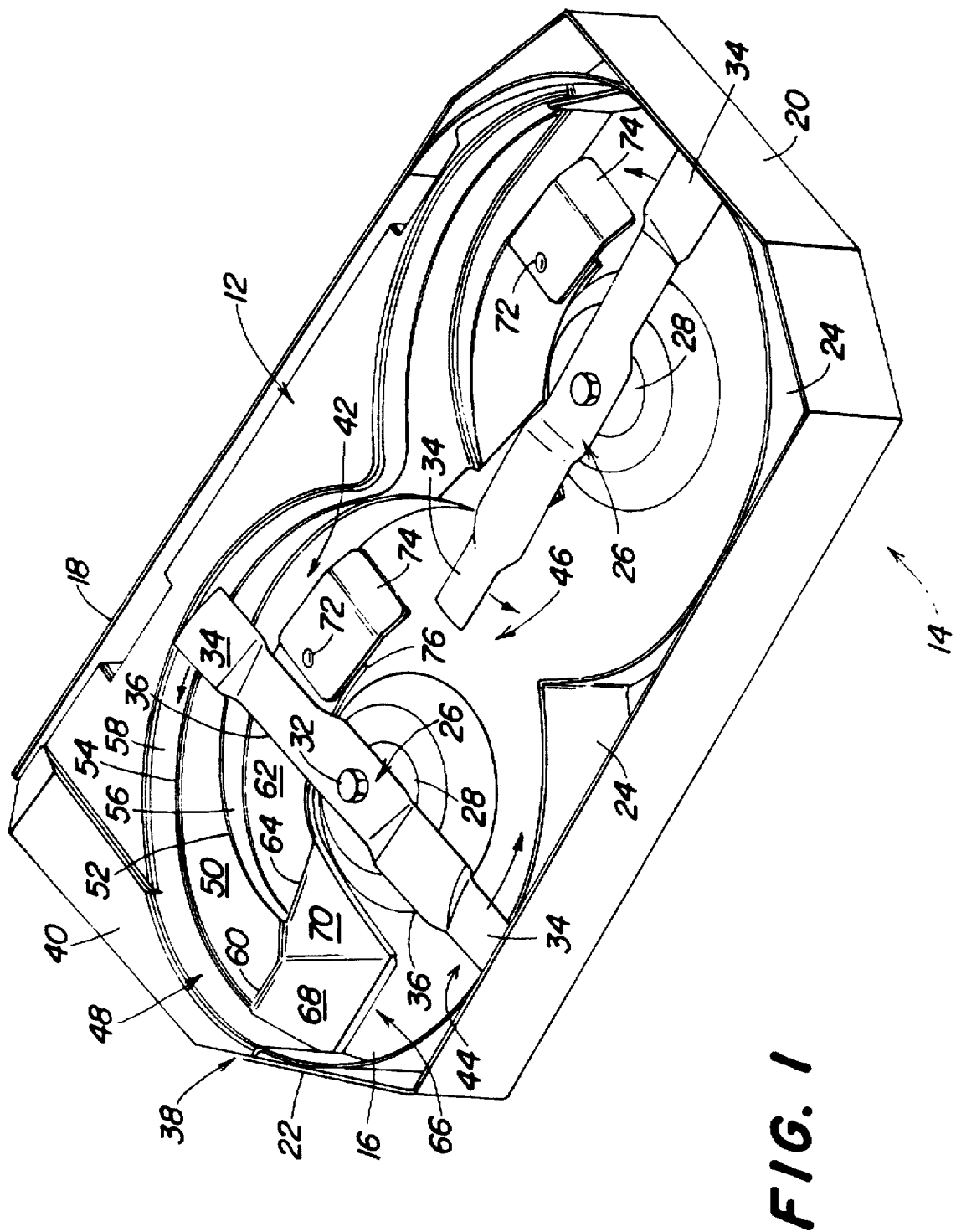
FIG. 1 is a perspective view of a mowing deck with the insert attached, the deck being viewed from the bottom.

Looking first to FIG. 1, there is found a perspective view of the cutting implement 10 and insert 12 as seen from beneath the implement housing 14. The housing or deck 14 includes a generally horizontally extending top deck member 16 and downwardly extending rear, front, left side, and right side members 18, 20 and 22. At the rearward portion of the deck 14 are semi-circular rings 24 which in the preferred embodiment extend downwardly from the deck surface 16 to provide a rear wall for the cutting chamber. Within each of the two cutting chambers, timed cutting blades 26 are rotatably supported on respective spindles 28

The blades 26 are supported to rotate in a plane space 30 below the top deck member 16, about generally vertically extending axes 32. Each blade 26 includes outer tip portions 34 adapted to cut material such as grass and radially inwardly spaced cutting portions 36 adapted for mulching or recutting of the grass clippings.

Looking also to FIG. 2, there is illustrated a bottom view of the mulching insert 12 shown in FIG. 1. The insert 12 is preferably made of a composite material such as plastic to facilitate the forming of smooth surfaces and minimize gaps, openings, and/or pockets between the surfaces of the insert 12 and those of the mower deck 14 since cut material could accumulate in those areas and influence air and material flow patterns within the cutting chamber.

Since the insert 12 used for two blades includes essentially similarly functioning sets of surfaces, only the left cutting chamber, as viewed in FIG. 1, and its insert surfaces will be reviewed in detail.

Figure 8:
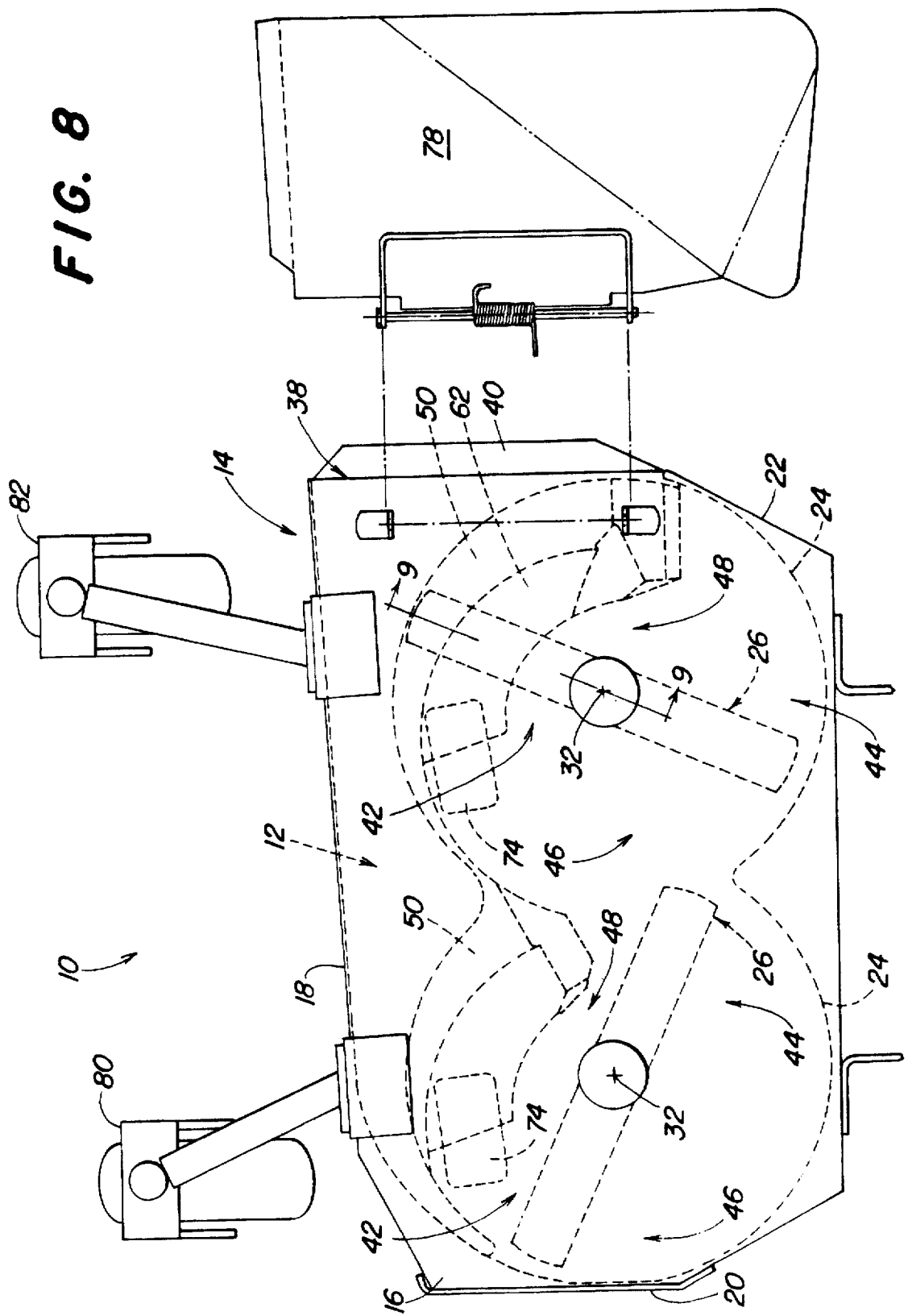
FIG. 8 is a schematic plan view of a mower deck with the insert shown in phantom and the removed discharge chute separated to one side.

The insert 12 is adapted to be detachably mounted within a conventional mower deck 14 having a discharge opening 38 to one side as is shown in schematic form in FIG. 8. To block the discharge opening 38, the insert 12 includes a plug section 40 on one side (See FIGS. 2 and 8). The insert 12 along with the ring portion 24 and top deck member 16 define the cutting chamber for the blade 26. This chamber includes front, rear, left and right side portions 42, 44, 46 and 48.

Looking now to FIGS. 1–7 and 9, it can be seen that the insert 12 includes a first generally horizontally extending ledge or second deck surface 50 spaced below the housing deck member 16. This ledge surface 50 extends generally horizontally between the front portion 42 of the cutting chamber and the one side portion 44 where clippings would usually be discharged. It includes inner and outer edges 52 and 54 which join first and second vertical wall surfaces 56 and 58. The ledge or second deck surface 50, extends generally from the front portion 42 of the cutting chamber to the one side portion 46 and ends at a terminal edge 60 at the one side portion 48. The wall surface 58 extends vertically downwardly from the ledge 50 and terminates just outwardly of the top portion 34 of the blade 26.

A mulching ramp surface 62 is provided in the insert 12 and also extends generally from the front portion 42 of the cutting chamber to the one side 48 thereof. The ramp surface 62 is radially spaced from the axis 32 of the blade 26 and is inclined downwardly, rearwardly and radially inwardly from the first deck member 16 to a terminal edge 64 above the plane of operation 30 of the blade 26, see FIG. 9. The ramp surface 62 is joined to the ledge surface 50 by the first vertical wall surface 56.

At their rear terminal edges 60 and 64, the ledge and ramp surfaces 50 and 62 are also joined with an end surface 66 which is comprised of first and second sections 68 and 70, those sections 68 and 70 slope upwardly sharply to the top deck member 16. The cutting chamber is essentially open from the top deck surface 16 to the blade 26 at the rear and other side portions 44 and 46 of the chamber.

Attaching the insert 12 to the mower deck 14 in the preferred embodiment are bolts 72 which also secure transition members 74 to the housing 14 to provide a smooth air flow from the top deck member 16 and on to the leading edge 76 of the ramp surface.

Looking now to FIGS. 3–7, sectional views of the insert 12 taken along lines 3—3 through 7—7 of FIG. 2 are found. These views illustrate the ledge or second deck member 50, the ramp surface 62 and the first and second walls 56 and 58 at the noted views designated in FIG. 2.

Looking now to FIG. 8, there is illustrated in schematic form a plan view of the deck 14 with the insert 12 identified with phantom lines. Spaced to one side is the discharge chute 78 that could be conventionally attached to the discharge opening 38 in the right side of the deck 14, but is removed when the insert 12 has been attached within the deck 14. At the front of the deck 14, left and right caster wheels 80 and 82 are carried.

Figure 9:
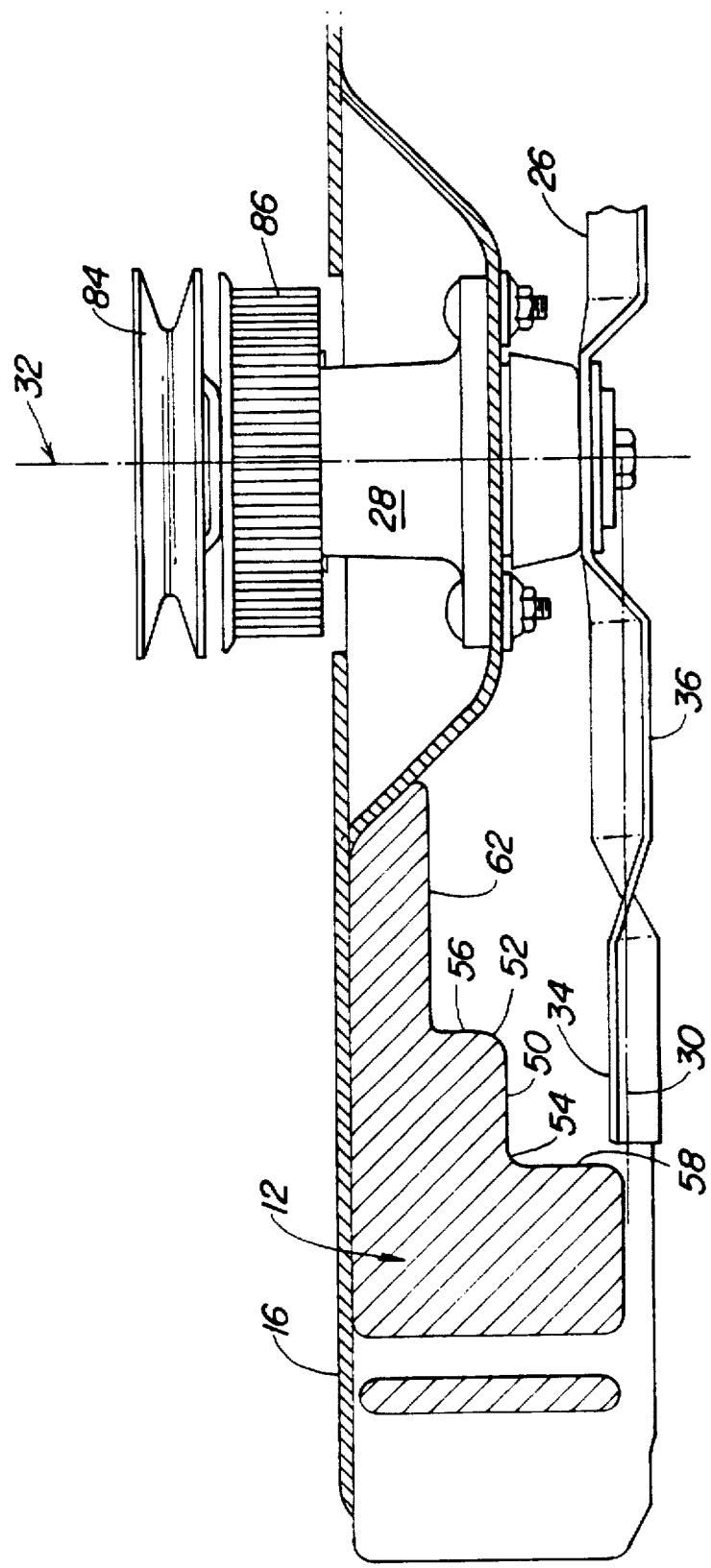
FIG. 9 is a sectional view of the spindle blade and insert taken along line 9—9 of FIG. 8, with the blade, spindle, drive pulley and timing belt also being illustrated.

Looking now to FIG. 9, there is illustrated a cross sectional view of the insert 12 taken along lines 9—9 in FIG. 8. Also included are the blade 26, support spindle 28, drive pulley 84 and timing belt 86. In this view, it can be seen that the tip portion 34 of the blade 26 passes just beneath the ledge or second deck portion 50. Since the cross sectional volume of the cutting chamber in this area is smaller, movement of the air and clippings is confined and streamlined as the blade 26 rotates through that area. With the cutting chamber extending from the top deck member 16 to the blade 26 in the rear and one side portions 44 and 46 thereof, the cross-sectional area is larger than that in front and the air and clippings will move less rapidly, being dispersed and falling back into the mulching blade.

In operation, the use of the insert 12 within the mower housing 14 can convert its operation from one of traditional side discharge cutting implement to one of a mulching mower. In this way, the collection and disposal of grass or other types of clippings is avoided.

As the implement is advanced over the ground, the blade 26 will be rotating at a high speed to create a circular air flow within the cutting chamber. The blade 26 would rotate counterclockwise as viewed in FIG. 1. Since the cross sectional area of the cutting chamber is reduced at the front and side portions 42 and 48 where the insert 12 is placed, the cross-sectional area through which the air and clippings circulate is smaller. Accordingly, the velocity at which the air and clippings will move through this confined area will be greater than the velocity at which they will move in the rear sections where the chamber is more open and has a larger cross-sectional area. This results in the cut material which is carried in the air stream to be rapidly conveyed along with the air stream below the ledge 50, reducing the tendency of the clippings to adhere surfaces 56, 58 adjacent the ledge 50 and extends beneath a portion of the ramp 62. As the cut material passes to the right or one side 48 where the insert 12 again joins the upper or top deck 16 of the mower housing 14, the cross-sectional area of the chamber volume increases and the velocity of the air and clippings will decrease, thereby allowing the cut particles to fall back into the blade path and/or to the ground. Those particles which do not fall to ground and are circulating in the air stream would be conveyed within the chamber and then deflected by the downwardly and inwardly sloping ramp surface 62 into the top portion 34 and mulching portion 36 of the blade 26 for recutting again (see FIG. 9). In this way, the material being cut would be circulated rapidly through the front and side portion of the cutting chamber, scouring the adjacent surfaces 50 and 58, then slow down in the rear and other side portions of the cutting chamber 44 or 46, to fall down or be carried on to be repeatedly mulched by the top portion 34 and outer edge of the mulching edge 36 of the blade and then distributed.

Since the insert 12 is comprised of a smooth material, the surfaces are smooth, the transitions between its surfaces are smooth and the insert 12 blends with the deck 14 components to minimize gaps, pockets and an accumulation of material in the chamber. Accordingly, turbulent air flow is also minimized. Further, there is less likelihood that material will collect in the walls of the cutting chamber, which would reduce the cutting efficiency unless frequently cleaned out by the operator. Also, the likelihood that clumps of material will collect within the chamber and fall out, leaving an undesirable appearance is reduced.

With the present invention there is provided a mulching insert which can be utilized to either convert a typical side discharge mower to a mulching configuration or be installed as a permanent fixture within a new mower deck. The insert provides smaller flow area in the front section of the cutting chamber to move cut material to the rear and side rapidly where it can be dispersed as it enters the larger chamber area or fall out onto the blade for mulching. The ramp surface provides for deflection of circulating cut material back into the mulching portion of the blade for repeated cutting and distribution down into the growing grass.

I claim:

1. A mulching mower with a housing having a generally horizontally extending deck member and downwardly extending rear and side members, a material cutting and mulching blade carried by the housing for rotation about a generally vertical axis and in a plane spaced below the deck member, the blade including material cutting outer tip portions;

a smooth surfaced composite mulching insert removably attached within the housing to form with said rear and side members a cutting chamber having front, rear and side portions, the insert including:

a ramp surface positioned generally within the front portion of the chamber, radially spaced from the axis of the blade, and inclined downwardly, rearwardly and radially inwardly from the deck member to a terminal edge above the plane of the blade;

a generally horizontally extending ledge surface in the front portion of the chamber between the deck member and the plane of the blade, said ledge surface being radially spaced from the axis of the blade and extending generally circumferentially between a first end near the front portion of the chamber to a terminal edge adjacent one side portion of the chambers said ledge surface including radially spaced apart inner and outer edges which are coupled with respective first and second generally vertically extending wall surfaces, the first wall surface extending upwardly to join the ramp surface and the second wall extending downwardly and terminating adjacent the plane of the blade, and an end surface interconnecting the terminal edges of the ledge surface and the ramp surface with the deck member.

2. The invention defined in claim 1 wherein the flow of air and material moved by the rotating blade is generally non-turbulent over the surfaces.

3. The invention defined in claim 1 wherein the ramp surface, ledge surface and end surface are all contained within a single plastic member.

4. A mulching mower with a housing having a generally horizontally extending first deck member and downwardly extending rear and side members, a material cutting and mulching blade carried by the housing for rotation about a generally vertical axis and in a plane spaced below the first deck member, the blade including cutting tip portions and mulching portions inwardly spaced of the tip portions;

a mulching insert within the housing to form with said rear and side members a cutting chamber having front, rear and side portions, the insert including:

a ramp surface positioned generally within the front portion of the chamber, radially spaced from the axis of the blade, and inclined downwardly, rearwardly and radially inwardly from the first deck member to a terminal edge above the plane of the blade to, direct material cuttings circulating within the cutting chamber radially inwardly and downwardly towards the mulching portions of the blade;

a generally horizontally extending second deck member in the front portion of the chamber between the first deck member and the plane of the blade, said second deck member being radially spaced from the axis of the blade and extending generally circumferentially between a first end near the front portion of the chamber to a terminal edge adjacent one side portion of the chamber, said second deck member including radially spaced apart inner and outer edges which are coupled with respective first and second generally vertically extending walls, the first wall extending upwardly to join the ramp surface and the second wall extending downwardly and terminating adjacent the plane of the blade, and an end member interconnecting the terminal edges of the second deck member and the ramp member with the first deck member.

5. The invention defined in claim 4 wherein growing material which is cut by the tip portions of the blades in the front portion of the chamber are directed rearwardly and sidewardly and converge into a stream beneath the second deck member for movement to the rear portion of the chamber which has a larger chamber volume than the front and side portions within which the second deck member is positioned.

6. The invention defined in claim 5 wherein the velocity of the air and clippings which results from rotation of the blade is greater in the front and side portions of the chamber below the second deck member than the associated velocity in the rear portion of the chamber.

7. The invention defined in claim 4 wherein the insert is formed of a composite material.

8. The invention defined in claim 7 wherein the ramp surface, second deck member, and end member are all contained within a single plastic member.

9. The invention defined in claim 8 wherein the ramp surface, the second deck member and end member each include outer surfaces which are exposed to material cut by the blade and are smooth and continuous so as to minimize cut material from collecting in gaps and openings in the housing.

10. The invention defined in claim 4 wherein the insert is removably attached to the mower housing.

11. The invention defined in claim 4 wherein the housing includes a material discharge opening in one side member and the insert further includes a plug section adapted to close the discharge opening.

12. The invention defined in claim 4 wherein the mower housing includes a plurality of laterally spaced apart blades, and said insert is operatively associated with said plurality of blades.

13. The invention defined in claim 4 wherein the ramp surface, second deck member, and end member are all contained within a plastic member.

14. The invention defined in claim 13, wherein the air movement over the plastic member generated by the rotating blade is generally non-turbulent.

* * * * *

UNITED STATES PATENT AND TRADEMARK OFFICE
CERTIFICATE OF CORRECTION

PATENT NO. : 5,765,346
DATED : 16 June 1998
INVENTOR(S) : Dean William Benter et al.

It is certified that error appears in the above-indentified patent and that said Letters Patent is hereby corrected as shown below:

Claim 1, column 5, lines 27-28, delete "chambers" and insert -- chamber, --.

Claim 4, column 5, line 60, delete " , ".

Signed and Sealed this

Eighth Day of December, 1998

Attest:

BRUCE LEHMAN

Attesting Officer     Commissioner of Patents and Trademarks